United States Patent
Fleenor et al.

(10) Patent No.: US 7,979,063 B2
(45) Date of Patent: Jul. 12, 2011

(54) SYSTEM AND METHOD FOR RESHAPING CUSTOMER AREAS OF A TELECOMMUNICATIONS CARRIER

(75) Inventors: Michael H. Fleenor, Greenville, NC (US); Beverly D. Vines, Speed, NC (US)

(73) Assignee: Embarq Holdings Company, LLC, Overland Park, KS (US)

( * ) Notice: Subject to any disclaimer, the term of this patent is extended or adjusted under 35 U.S.C. 154(b) by 805 days.

(21) Appl. No.: 11/711,998

(22) Filed: Feb. 28, 2007

(65) Prior Publication Data

US 2008/0207191 A1    Aug. 28, 2008

(51) Int. Cl.
*H04W 4/00* (2009.01)
*H04W 40/00* (2009.01)

(52) U.S. Cl. .................. 455/422.1; 455/446

(58) Field of Classification Search .............. 455/422.1, 455/446
See application file for complete search history.

(56) References Cited

U.S. PATENT DOCUMENTS 6,304,754 B1 * 10/2001 DeSantis et al. ............. 455/436
6,640,103 B1 * 10/2003 Inman et al. ................. 455/446

OTHER PUBLICATIONS

MapInfo Corporation, About MapInfo Professional Screen Shot, MapInfo Software Program.
MapInfo Corporation, Map Window Preferences Screen Shot, MapInfo Software Program.

* cited by examiner

*Primary Examiner* — Marivelisse Santiago-Cordero
(74) *Attorney, Agent, or Firm* — SNR Denton US LLP

(57) ABSTRACT

A system and method for changing area boundaries that encompass customers serviced by a telecommunications carrier may include an electronic display configured to display graphical images and a storage unit configured to store information associated with the customers serviced by a telecommunications carrier and area boundaries. A processing unit may be in communication with the electronic display and storage unit, and be configured to execute software. The software may display indicia representative of a geographic area of the customers serviced by the telecommunications carrier. Adjacent area boundaries may be displayed on the geographic area, where at least two of the area boundaries share at least one common point along the boundaries. The processing unit may further enable a user to selectively reposition a common point along at least two area boundaries of different types and reshape the area boundaries based on the repositioned common point.

19 Claims, 8 Drawing Sheets

SYSTEM AND METHOD FOR RESHAPING CUSTOMER AREAS OF A TELECOMMUNICATIONS CARRIER

BACKGROUND OF THE INVENTION

Telecommunications carriers provide service within specific geographic areas. The geographic areas are called exchanges and are subdivided into one or more geographic area called wire centers. The wire centers are further subdivided into geographic areas called customer serving areas (CSAs). Exchange areas, wire center areas, and customer serving areas are represented in various software management systems as polygons having nodes and lines connecting the nodes to form a region or area.

To manage and service customers of the telecommunications carrier within the exchanges, accurate records of the boundaries for the exchanges, wire centers, and customer service areas must be kept. Accurate records of the areas means that every part of an exchange be included in only one of the one or more wire centers that subdivide the exchange area. In addition, every part of a wire center area is to be included in only one of the customer serving areas that subdivide the wire center. FIG. 1 is an illustration of an exemplary geographic region 100 over which a telecommunications carrier services customers. Wire center Cripple Creek 102 is shown to be adjacent to wire centers Rural Retreat 104, Wytheville 106, Austinville 108, Fries 110, and Corners Rock 112. Each wire center is further divided into customer serving areas, designated by a three-digit number (e.g., 001, 002, 003, etc.).

From time to time, in the normal course of administering a telecommunications services within exchange areas, wire center and customer serving area boundaries are changed. One customer serving area may be enlarged while adjacent customer serving area(s) are reduced in size. In effect, the area defining one customer serving area is transferred or redefined, which may cause a portion of the area to be in another customer serving area. In addition, existing customer serving areas may be subdivided into two or more smaller customer serving areas. There are many possible changes to existing customer serving areas that effectively change the boundaries of one or more existing customer serving area. Just as customer servicing area boundaries may change, wire center area boundaries may also change.

The nodes and lines that define an area boundary may be represented in different ways. One common method is to define a node as a specific latitude and longitude coordinate pair. Commercially available area management software programs, such as MapInfo, uses this method for defining nodes of a region or area. Using latitude and longitude coordinate pairs allows the software to properly plot the nodes of one region in relation to the nodes of other regions. Regions, whether an exchange, wire center, or customer serving area, share a common boundary with adjacent regions of the same type (i.e., exchange with exchange, wire center with wire center). In addition, nodes of a larger area (exchange or wire center) are shared by one or more of the smaller subdividing areas (wire centers and customer serving areas within an exchange, and customer serving areas within a wire center). If the nodes of the shared boundary are not positionally identical, then a "gap" exists between the two or more boundaries.

For example, FIG. 2 is an illustration of an exemplary geographic region 200 that includes two adjacent areas, Area 1 and Area 2. Area 1 is defined by a polygonal boundary or perimeter having five sides and five nodes (a, b), (c, d), (e, f), (g, h), and (i, j). Area 2 is defined by a polygonal parameter having six sides and six nodes (k, l), (m, n), (c, d), (e, f), (g, h), and (p, q). Areas 1 and 2 share a boundary represented by the lines connecting nodes (c, d), (e, f), (g, h).

While the boundary between Areas 1 and 2 appear as a single set of lines, the software defines each area as independent area objects. As independent objects, it is possible to change the node locations of one area, resulting in a reshaping of the object without changing the shape of the other objects. If a change in the shape of one object is not matched with a corresponding change in the adjacent object, then a "gap" results. The resulting gap is unacceptable, as it violates the requirements previously set forth requiring that every part of a larger area be included in one, but only one, of the subdividing areas. However, FIG. 3 is an illustration of geographic region 200 showing a gap 302 between adjacent customer serving areas resulting from node (e, f) of Area 2 being moved to location (e', f'). Such a situation most notably occurs when areas of different types (e.g. wire center and customer serving area) are moved because each type is typically stored on a separate layer. Subscribers of a telecommunications carrier that fall within this gap are unaccounted for in either Area 1 or Area 2. If Area 1 and Area 2 are customer serving areas in two different wire centers, then the boundary between Area 1 and Area 2 is also a boundary between two wire centers. Further, if Area 1 and Area 2 are in two different exchanges, the boundary between Area 1 and Area 2 is an exchange boundary as well as a wire center boundary.

As understood in the art, telecommunications carriers have personnel who constantly monitor for gaps caused by area planners who reshape exchange areas, wire center areas, and customer serving areas using conventional area management software programs. In the event of finding these "gaps," the personnel must physically manipulate the area boundaries to ensure that subscribers residing within the gaps are accounted. Given the fact that typical wire center areas may have customer serving areas with over 100 nodes, tens of nodes along a shared boundary between two customer serving areas, and ten or more adjacent regions adjacent to a single customer serving area, the process for locating gaps can be tedious, time-consuming, and expensive for a telecommunications carrier.

SUMMARY

To overcome the problem of gaps being created between boundaries of different types of regions by area planners repositioning area boundaries represented as separate polygons by conventional area management software programs, the principles of the present invention provide for a software tool to determine area boundaries sharing a common point and adjust each of the area boundaries sharing that common point. By reshaping the area boundaries sharing the common point in a corresponding manner, gaps are not created between boundaries of different types of areas, wire center areas and/or customer serving areas, for example.

One embodiment includes a system for changing area boundaries that encompass customers serviced by a telecommunications carrier. The system may include an electronic display configured to display graphical images and a storage unit configured to store information associated with the customers serviced by a telecommunications carrier and area boundaries. A processing unit may be in communication with the electronic display and storage unit, and be configured to execute software. The software may display indicia representative of a geographic area of the customers serviced by the telecommunications carrier. A plurality of adjacent area boundaries may be displayed on the geographic area, where at least two of the area boundaries share at least one common point along the boundaries. The processing unit may further enable a user to selectively reposition a common point along at least two area boundaries and reshape the area boundaries based on the repositioned common point.

Another embodiment may include a process for changing area boundaries that encompass customers serviced by a telecommunications carrier. The process may include displaying indicia representative of a geographic area of customers serviced by a telecommunications carrier, displaying adjacent area boundaries on the geographic area, where at least two of the area boundaries share at least one common point along the boundaries, enabling a user to selectively reposition a common point along at least two area boundaries, and reshaping the area boundaries based on the repositioned common point.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
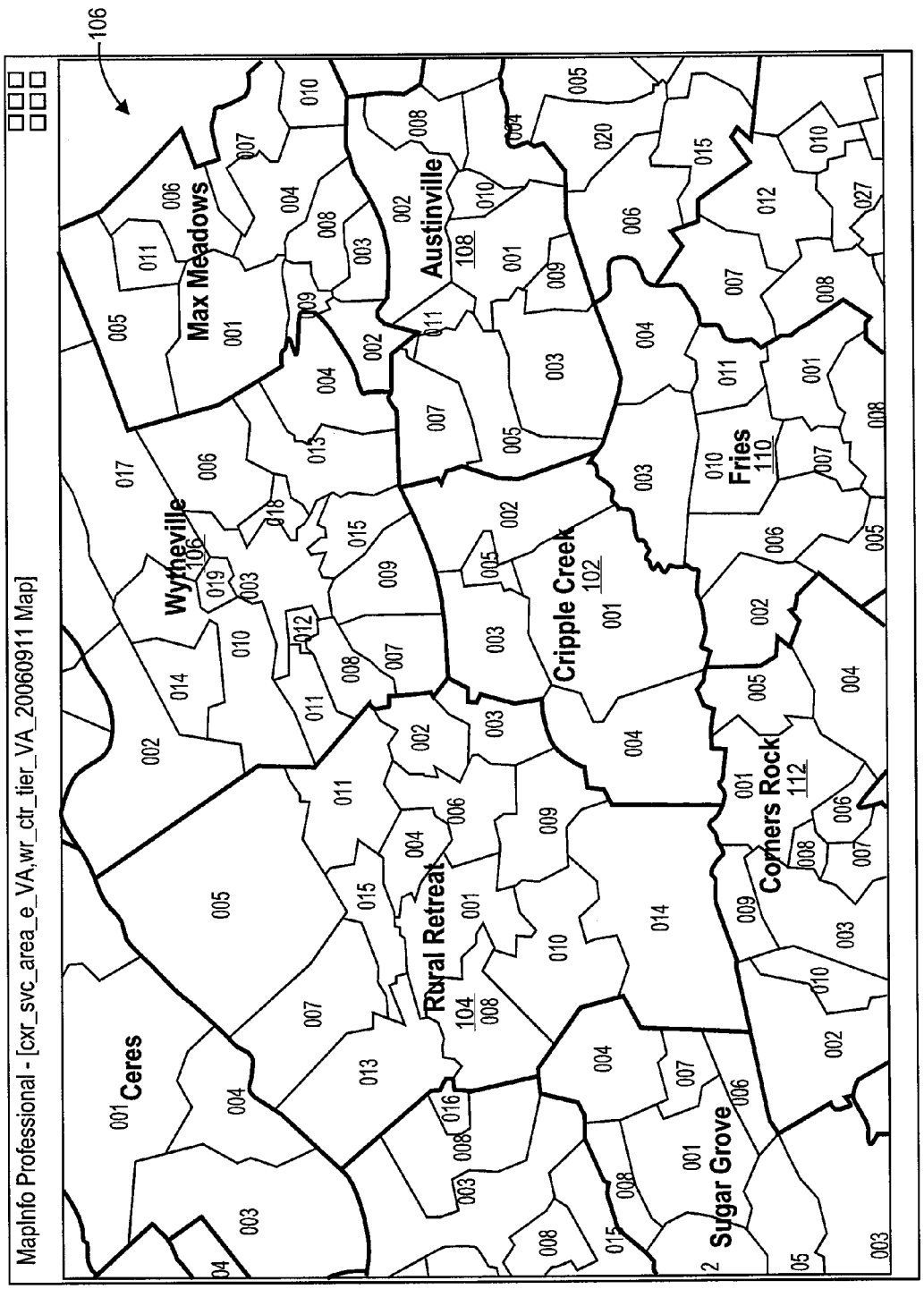
FIG. 1 is an illustration of an exemplary geographic region over which a telecommunications carrier services customers.
Figure 2:
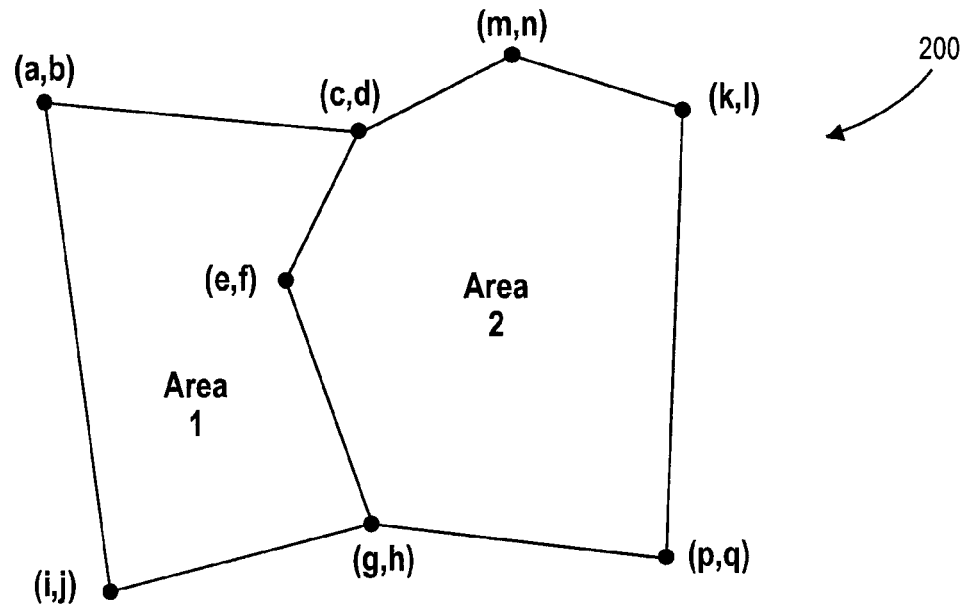
FIG. 2 is an illustration of an exemplary geographic region that includes two adjacent areas.
Figure 3:
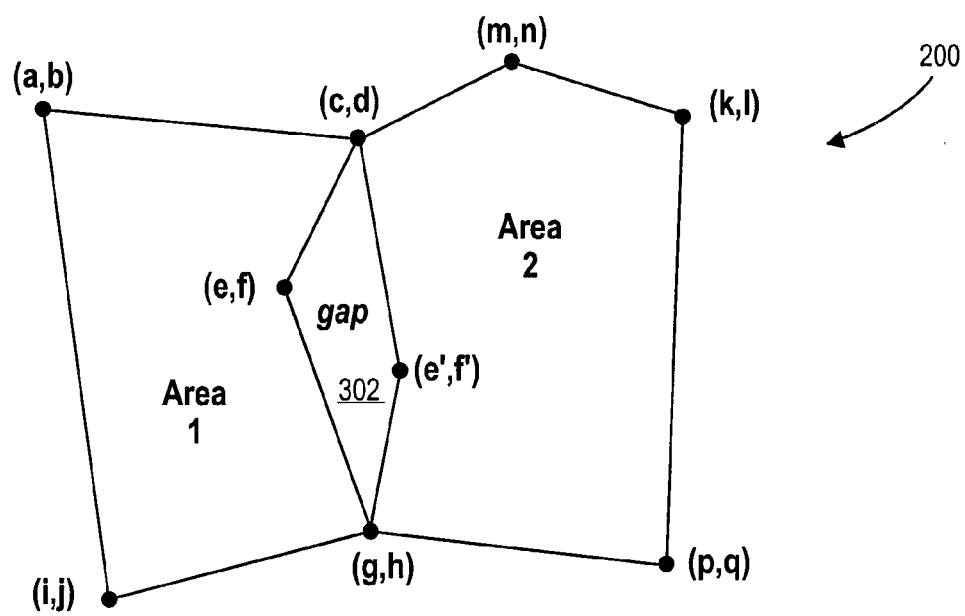
FIG. 3 is an illustration of the geographic region showing a gap between adjacent customer serving areas resulting from moving a node of one customer serving area.
Figure 4:
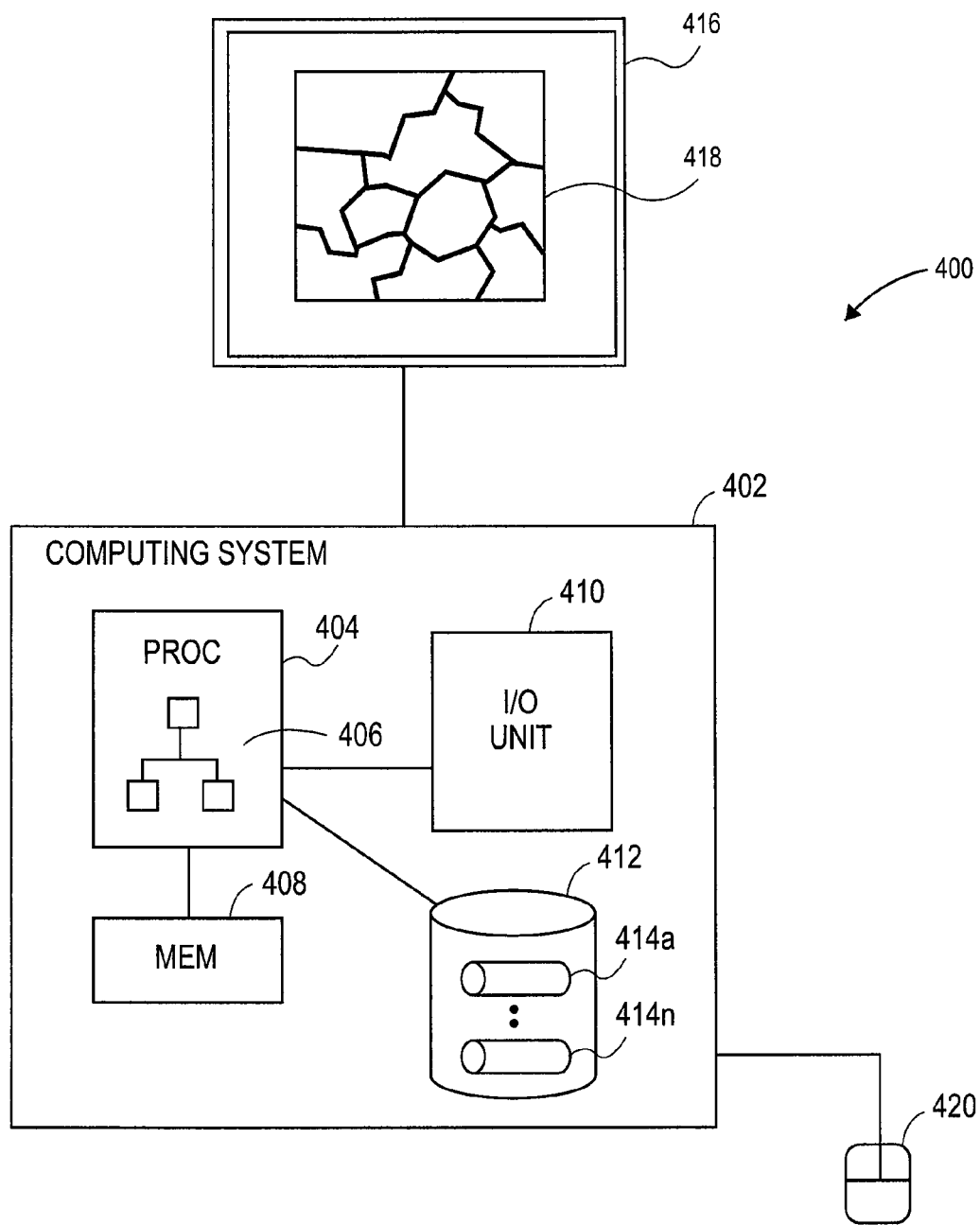
FIG. 4 is a block diagram of an exemplary system for changing area boundaries in accordance with the principles of the present invention.

FIG. 4 is a block diagram of an exemplary system for changing area boundaries in accordance with the principles of the present invention. The system 400 includes a computing system 402 that may include a processor 404 that executes software 406. The processor 404 may be in communication with memory 408 to store data and software being executed, and input/output (I/O) unit 410 that enables the processor 404 to communicate with external devices, and a storage unit 412 that stores data associated with geographic areas and area boundaries. In one embodiment, the storage unit 412 may include one or more databases 414a-414n (collectively 414) that include data associated with the geographic areas and area boundaries. The geographic areas and area boundaries may be those that are used by a telecommunications carrier for managing customers of wire centers. Alternatively, the geographic areas and area boundaries may be used for other purposes, such as real estate development or sales territories. It should be understood that the databases may be text files or any other formatted files that include the data. In one embodiment, data representative of graphics images, area boundaries, customers, or other parameters used by a telecommunications carrier may be stored in the same or separate data files.

An electronic display 416 may be in communication with the processor 404 via the I/O unit 410. The electronic display 416 may be configured to display a graphical image 418 of data representatively of a geographic area for which a telecommunications carrier, for example, may service. A pointing device 420, such as a computer mouse, may be in communication with the processor 404 via the I/O unit 410.

In operation, the software 406 being executed by the processor 404 may cause data stored in the storage unit 412 to be used to generate a graphical image to be displayed on the electronic display 416. The data may define common information, such as geographical information and customer serving areas, as separate layers for processing and displaying on the electronic display 416 on multiple layers. For example, indicia of a geographic area, such as geographic areas serviced by one or more wire centers, may be displayed on a first layer. The indicia may include names of wire centers, streets, buildings, or other indicia representative of the geographic area being serviced by the wire centers. Area boundaries may be overlayed over the first layer having the indicia of the geographic area. For example, wire center area boundaries may overlay the geographic area displayed on a first layer by displaying the wire center area boundaries in a second layer. Similarly, customer servicing area boundaries may be included on a third layer to be displayed over the geographic area and wire center area boundaries. Such layers may be analogized to having multiple clear plastic sheets with text and/or graphics printed on each clear plastic sheet, such that when the sheets are placed on top of one another, a viewer can see all of the information on each of the sheets.

The software 406 may enable a user to view and interactively select data (e.g., area boundaries) displayed on the electronic display 416. In addition, the software may operate to manage data stored in the storage unit 412. The software 406 may be a software system that exists and incorporates the principles of the present invention as a software tool or is stand-alone software that utilizes the data stored in the databases 414.

In general, area management software programs use polygons to represent geographic regions, such as customer service areas. To avoid gaps being created between adjacent area boundaries, corresponding sets of nodes having identical coordinate pairs may be maintained. In other words, adjacent geographic regions that have one or more nodes in common (i.e., a node having the same coordinates for each of the adjacent regions) are to maintain the same coordinates of those common nodes after a node is repositioned for one of the area boundaries. Maintaining common coordinates of a node of adjacent area boundaries is performed to avoid gaps from forming even though the area boundaries are independently stored and displayed. The area boundaries may be defined by coordinate pairs having straight lines extending therebetween. However, the principles of the present invention are compatible with graphics tools that support curved lines extending between the nodes.

Figure 5A:
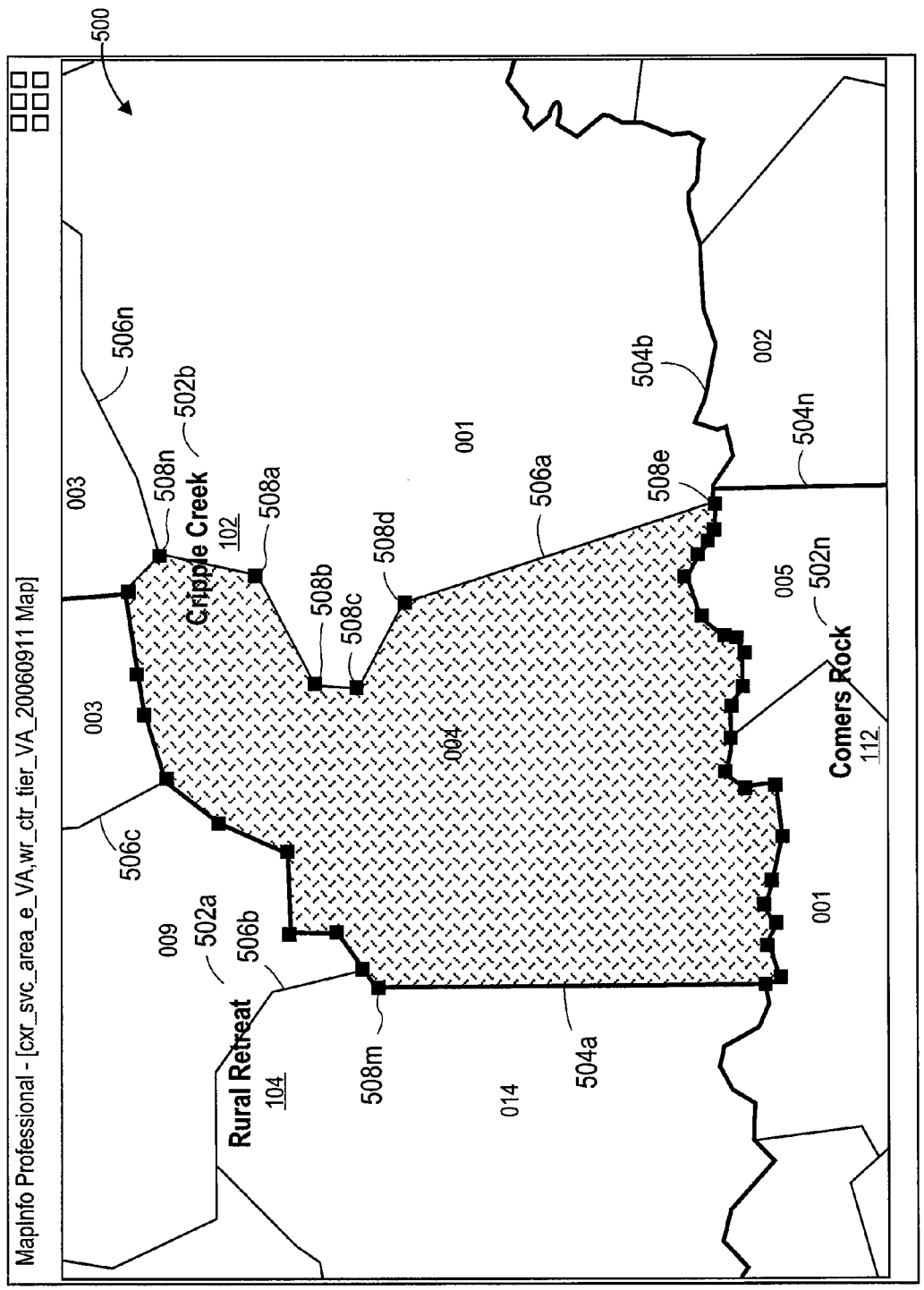
FIG. 5A is an image of an exemplary geographic area having area boundaries disposed thereon with a highlighted customer serving area selected to enable a user to selectively reposition a node of the area boundary.

FIG. 5A is an image of an exemplary geographic area 500 having area boundaries disposed thereon with a highlighted customer serving area 004 selected to enable a user to selectively reposition a node of the area boundary. Indicia 502a-502n (collectively 502) representative of a geographic area may be displayed on a first layer. As shown, the indicia 502 are names of areas that are serviced by wire centers. A name of a wire center is considered to be geographic information. As shown, wire center area boundaries 504a-504n (collectively 504) are thick lines and customer serving area boundaries 506a-506n (collectively 506) are thinner lines than the wire center area boundary lines 504. It should be understood that other thicknesses or line styles (e.g., dashed, dash-dot, or otherwise) may be utilized in accordance with the principles of the present invention.

Customer servicing area 004 of wire center area, known as Cripple Creek 102, is shown to be highlighted in response to a user selecting the customer servicing area 004 via a pointing device, such as a computer mouse. In addition to being highlighted, nodes 508a-508n (collectively 508) that defines a discontinuity or other location on the perimeter of the customer servicing area 004 is displayed. These nodes 508 may be selectable by a user for repositioning. In one embodiment, the nodes may be selected by a user using a computer mouse and dragged to another location as understood in the art. This dragging may be interactive and show the customer servicing area changing as the user repositions the node. Alternatively, the user may double-click on a node and a pop-up window or interactive display may be displayed with the coordinates of the node. The user may enter new coordinates for the node in the pop-up window or other interactive display to change the coordinates of the node. The location of the node may be repositioned in response to the user entering the new node coordinates and displayed accordingly.

Figure 5B:
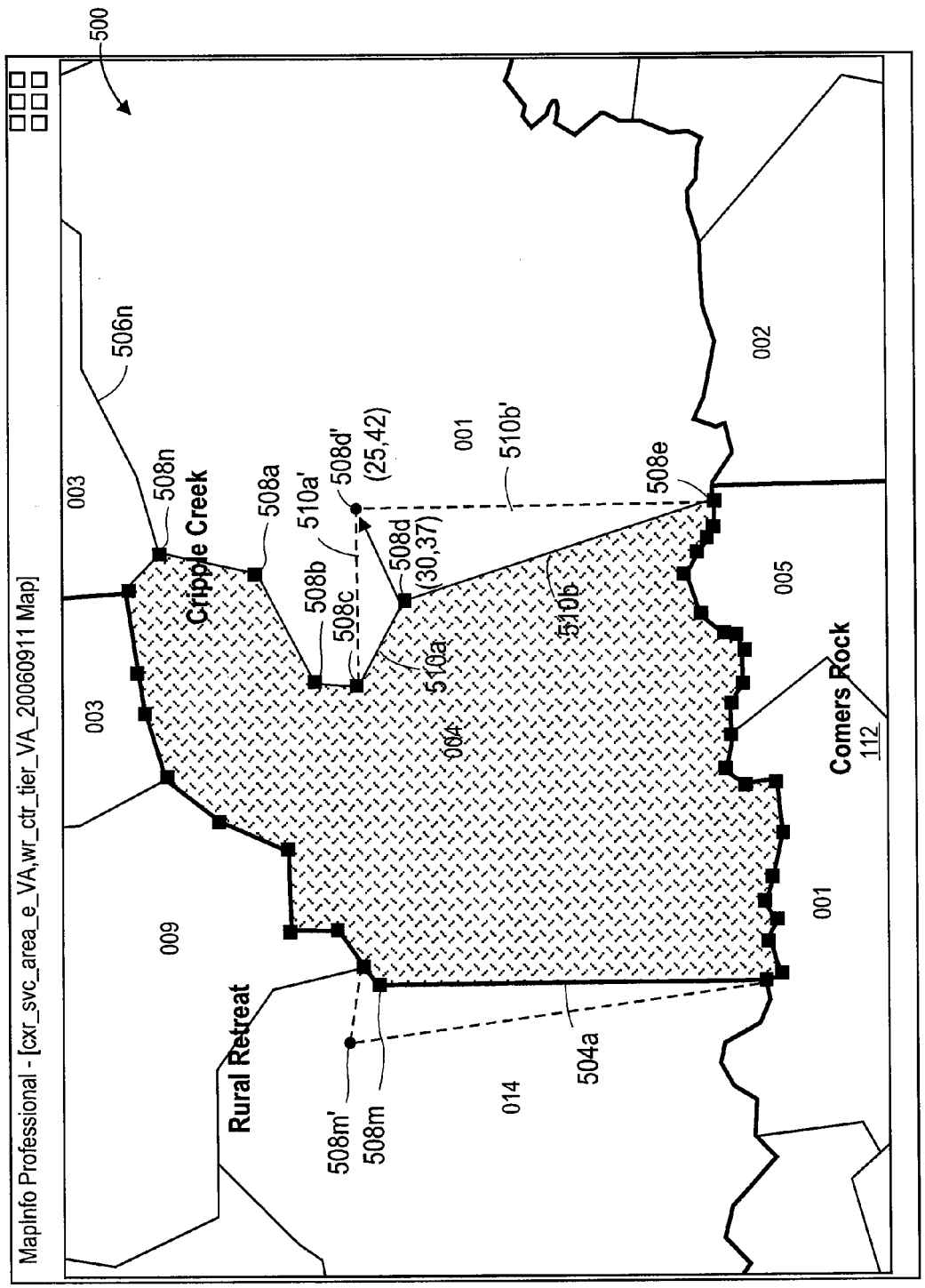
FIG. 5B is a geographic area of FIG. 5A with one of the nodes of the customer serving area repositioned.

FIG. 5B is a geographic area of FIG. 5A with one of the nodes of the customer serving area repositioned. As shown, node 508d is repositioned to node 508d'. The coordinates change from coordinates (30, 37) to (25, 42). This node, which is common to both customer servicing areas 004 and 001, by being moved from a first position to a second position causes line 510a extending between nodes 508c and 508d) and line 510b (extending between node 508d and 508e) to correspondingly move when the node 508d is repositioned to node 508d', thereby becoming lines 510a' and 510b'. In accordance with the principles of the present invention, while the area perimeter for customer servicing area 004 is being repositioned or reshaped, each area boundary common to the node 508d is correspondingly repositioned, in this case, customer servicing area 001 is repositioned. It should be understood that if a wire center area boundary shares a node with a customer servicing area boundary that is being moved, then the wire center area boundary is correspondingly repositioned as well.

Repositioning a common node of two different types of boundaries, which are generally stored on different layers, are also correspondingly repositioned in accordance with the principles of the present invention. As further shown in FIG. 5B, node 508m is repositioned to coordinates at node 508m'. Node 508m corresponds to both a wire center area boundary 504a and customer serving area boundary of customer serving area 004. In response to a user moving the position of node 508m to node 508m', the principles of the present invention determine that a node is associated with boundaries on multiple layers and may move each boundary on each region, accordingly.

More specifically, the software 406 (FIG. 4) may perform a number of functions that enable a user to reshape an area boundary. When the user has selected a node to be moved, the software 406 may record the coordinates of the original location of the node. The user may then move the node to a new location. When the user releases the mouse button or other pointing device, the software 406 may record the coordinates of the new location of the node. Software queries may search all adjacent areas for nodes with the same coordinates as the beginning coordinates of the node that was moved and change the coordinates of the corresponding nodes to the new coordinates. The display of the area may be refreshed to show the new shape of the selected area and adjacent areas. Alternatively, the changes made to the selected area may be buffered until the user is finished reshaping the area. In response to completion of the reshaping, the software 406 may implement the changes in the adjacent areas for display. Data indicative of the changed area perimeters may be stored for each of the polygons that were affected by repositioning the nodes.

Other changes to area perimeters may be performed. For example, if the user reshapes an area by adding a new node on a line in a selected area, the software 406 may record the coordinates of a node. Thereafter, the line receiving the new node may be segmented to include the coordinates of the new node so that two lines separate the previous end nodes of the line. The software 406 may identify the new node coordinates and apply the new node on adjacent area boundaries that share the boundary to which the new node was added. Identification of corresponding pairs of node coordinates in adjacent areas may be performed immediately or after the new node is added.

Figure 6:
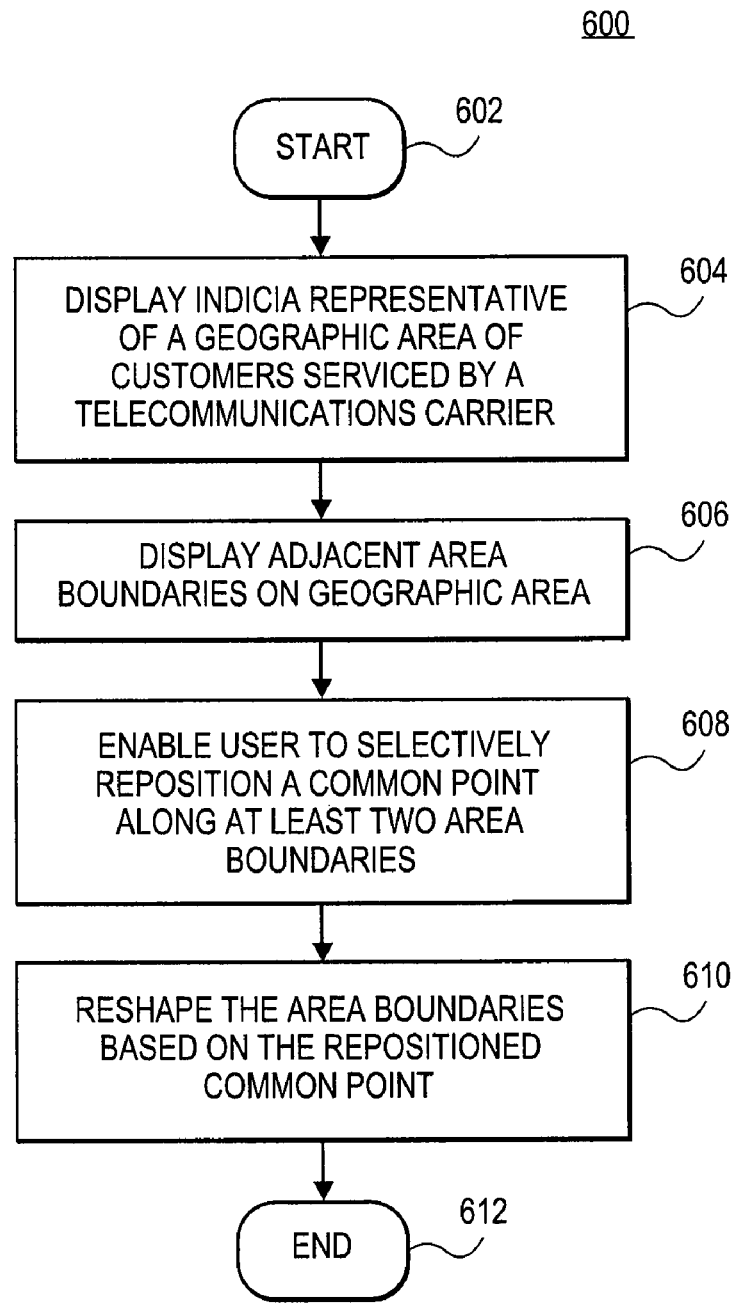
FIG. 6 is a flow diagram of an exemplary process for changing an area boundary in accordance with the principles of the present invention.

FIG. 6 is a flow diagram of an exemplary process 600 for changing an area boundary in accordance with the principles of the present invention. The process 600 starts at step 602. At step 604, indicia representative of a geographic area of customer service by a telecommunications carrier may be displayed. At step 606, adjacent area boundaries on geographic areas may be displayed. A user may be enabled to selectively reposition a common point (e.g., node) along at least two area boundaries at step 608. At step 610, the area boundaries may be reshaped based on the repositioned common point. In one embodiment, the area boundaries are of different types and stored on different layers, files, or tables. The process 600 ends in step 612.

Figure 7A:
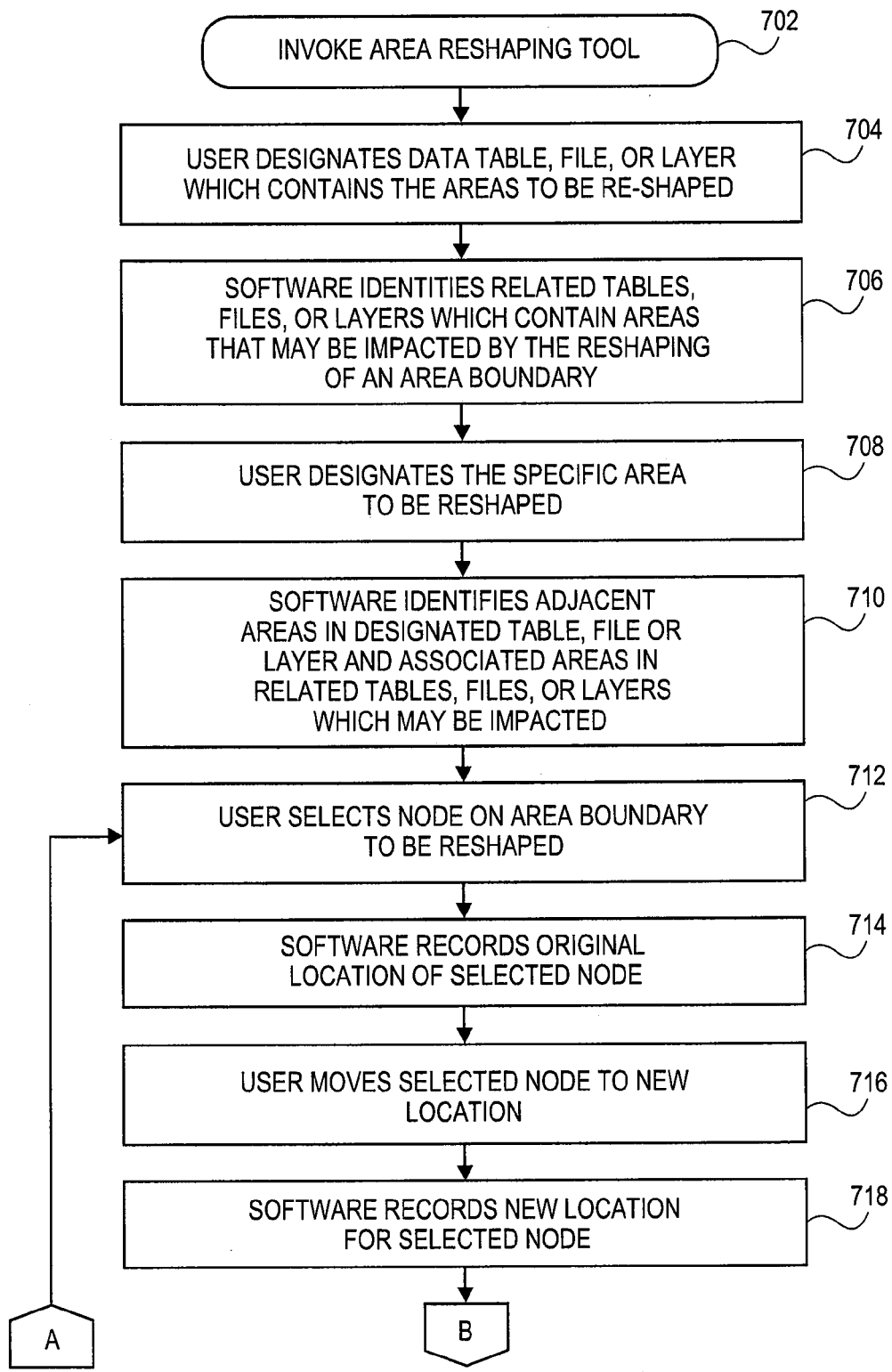
FIGS. 7A and 7B are a flow diagram of a more detailed process for reshaping an area in accordance with the principles of the present invention.
Figure 7B:
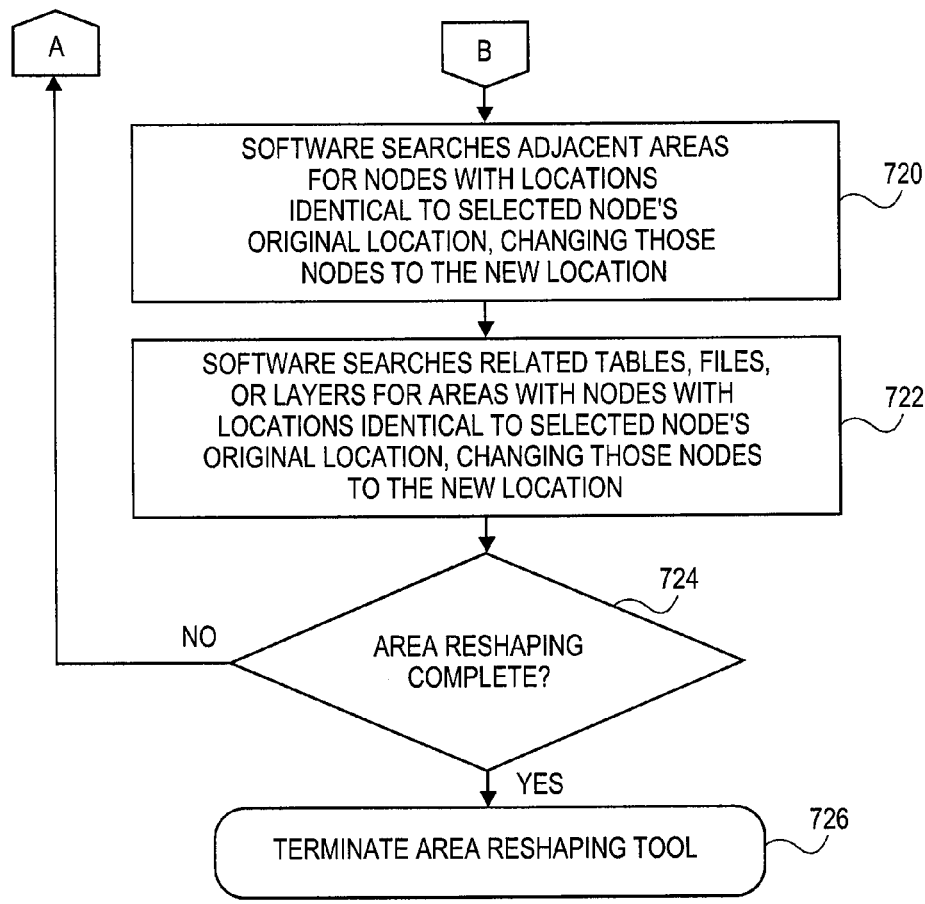

FIGS. 7A and 7B are a flow diagram of a more detailed process for reshaping an area in accordance with the principles of the present invention. The process 700 starts at step 702, where an area reshaping tool is invoked. At step 704, a user may designate a data table, file or layer that contains areas to be reshaped. The designation may be performed by selecting an area to be highlighted on a graphical user interface. Alternatively, the user may select a particular layer from a list of layers, where each layer includes different information being displayed on the graphical user interface.

At step 706, software may identify related tables, files, or layers that contain areas that may be impacted by the reshaping of an area boundary. At step 708, the user may designate a specific area to be reshaped. Software may identify adjacent areas in designated tables, files or layers and associated areas in related tables, files or layers that may be impacted. At step 712, the user selects a node on an area perimeter to be reshaped. At step 714, the software may record original location of the selected node. At step 716, the user may move the selected node to a new location and the software records the new location for the selected node at step 718.

Continuing on FIG. 7B, at step 720, the software may search adjacent areas for nodes with locations identical to the original location of the selected node and change those nodes to the new location. At step 722, the software may search related tables, files or layers for areas with nodes with locations identical to the original location of the selected node and changing those nodes to the new location. By changing the location of the nodes on different tables, files, or layers, boundaries of different area types are moved to ensure that gaps are not formed between boundaries, no matter what area types are adjacent. At step 724, a determination is made if the area reshaping is complete. If the area reshaping is not complete, the process returns to step 712. Otherwise, if the area reshaping is complete, then the process 700 terminates at step 726.

As described, one or more data tables may be maintained to manage information associated with customers in geographic regions for wire centers of a telecommunications carrier. The data tables may include coordinates of nodes for wire center area boundaries, customer servicing area boundaries, and customers in a geographical area. The information may include coordinates for the nodes and customers. Based on the position of the nodes that define an area perimeter, customers positioned within each perimeter may be determined. Software may be utilized to count the number of customers within each area perimeter to enable planners to accurately determine the number of customers within each customer servicing area and determine growth or contraction of customers within those customer servicing areas. By being able to monitor the number of customers grown or departing from customer servicing areas, planners of the telecommunications carrier may more easily reshape a customer servicing area.

While the principles of the present invention have been described with regard to telecommunications applications, it should be understood that the principles of the present invention may also be utilized for non-telecommunications applications. For example, the principles of the present invention may be utilized for real estate applications, such as determining property lines, marketing and sales applications, such as a sales team managing regional areas and customers located within those areas, and any other application that generally manages areas and customers and property within those areas. Information, such as number of homes currently on the market to be sold or number of customers in a sales territory, associated with non-telecommunications applications may be determined based on area boundaries.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for changing area boundaries that encompass customers serviced by a telecommunications carrier, said system comprising:
   an electronic display configured to display graphical images;
   a storage unit configured to store information associated with the customers serviced by a telecommunications carrier and area boundaries;
   a processing unit in communication with said electronic display and storage unit, said processing unit configured to execute software to:
      display indicia representative of a geographic area of the customers serviced by the telecommunications carrier;
      display a plurality of adjacent area boundaries on the geographic area, at least two of the area boundaries sharing at least one common point along the boundaries;
      enable a user to selectively reposition a common point along at least two area boundaries of different types; and
      reshape the at least two area boundaries of different types based on the repositioned common point.

2. The system according to claim 1, wherein the area boundaries include customer service area boundaries.

3. The system according to claim 1, wherein the area boundaries include wire center area boundaries.

4. The system according to claim 1, wherein display of the adjacent area boundaries include displaying nodes and lines connecting the nodes.

5. The system according to claim 4, wherein the common point is a node.

6. The system according to claim 1, wherein software is configured to selectively reposition the common point interactively.

7. The system according to claim 6, wherein the software is configured to reshape the at least two area boundaries substantially simultaneously.

8. The system according to claim 1, wherein the software is further configured to store updated information of the reshaped at least two area boundaries.

9. The system according to claim 1, wherein the software is further configured to determine at least one statistic of customers of the telecommunications carrier included within each area boundary.

10. The system according to claim 1, wherein the area boundaries are represented by and displayed as polygons.

11. A method for changing area boundaries that encompass customers serviced by a telecommunications carrier, said method comprising:
    displaying indicia representative of a geographic area of customers serviced by a telecommunications carrier;
    displaying a plurality of adjacent area boundaries on the geographic area, at least two of the area boundaries sharing at least one common point along the boundaries;
    enabling a user to selectively reposition a common point along at least two area boundaries of different types; and
    reshaping the at least two area boundaries of different types based on the repositioned common point.

12. The method according to claim 11, wherein displaying the area boundaries includes displaying wire center area boundaries.

13. The method according to claim 11, wherein displaying adjacent area boundaries includes displaying nodes and lines connecting the nodes.

14. The method according to claim 13, wherein enabling a user to selectively reposition a common point includes enabling the user to selectively reposition a node.

15. The method according to claim 11, wherein selectively repositioning the common point is performed interactively.

16. The method according to claim 15, wherein reshaping the at least two area boundaries includes reshaping the boundaries substantially simultaneously.

17. The method according to claim 11, further comprising storing updated information of the reshaped at least two area boundaries.

18. The method according to claim 11, further comprising determining at least one statistic of customers of the telecommunications carrier included within each area boundary.

19. The method according to claim 11, wherein displaying the adjacent area boundaries includes displaying polygons having common points.

* * * * *